Patented Oct. 28, 1930

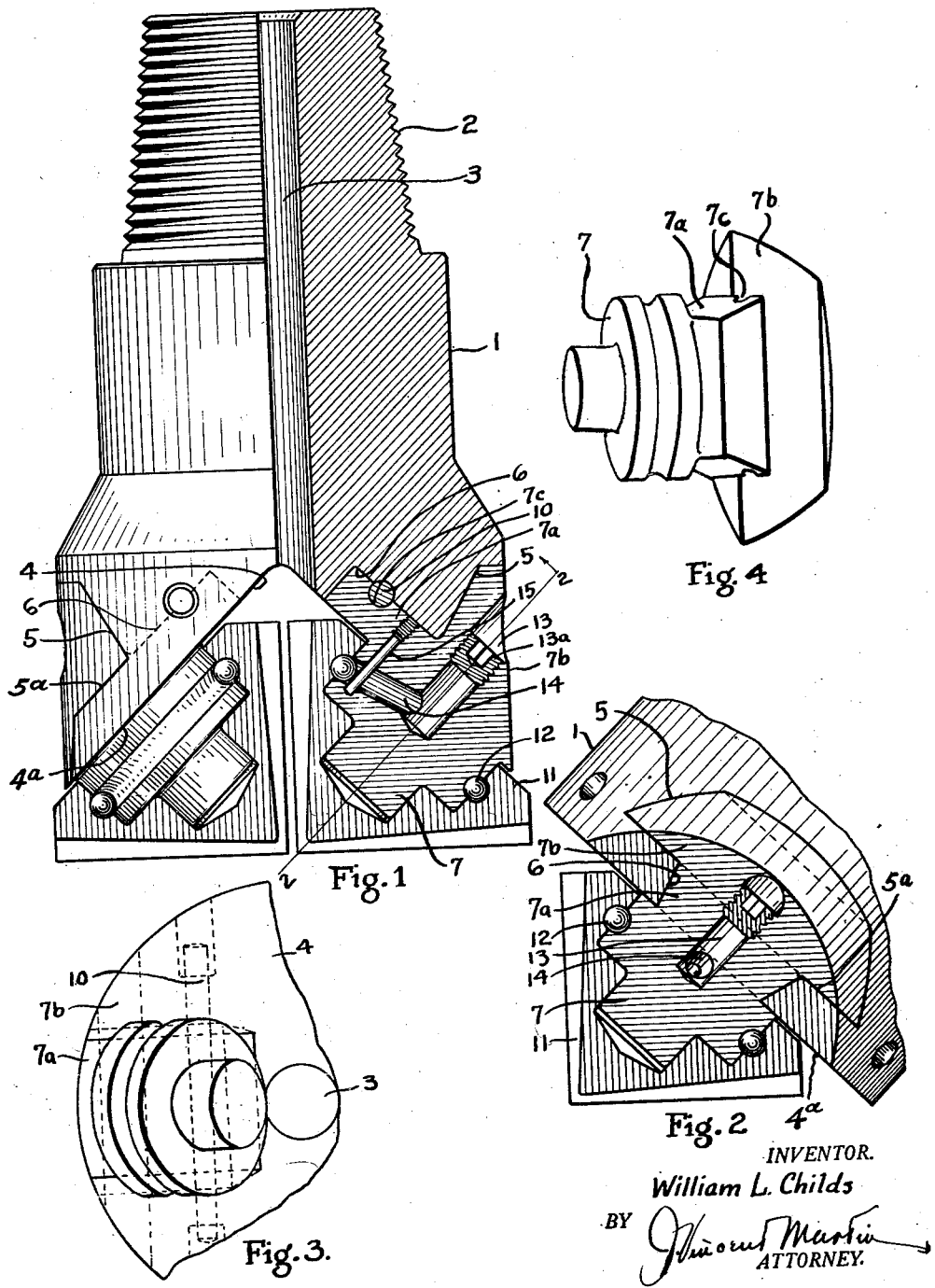

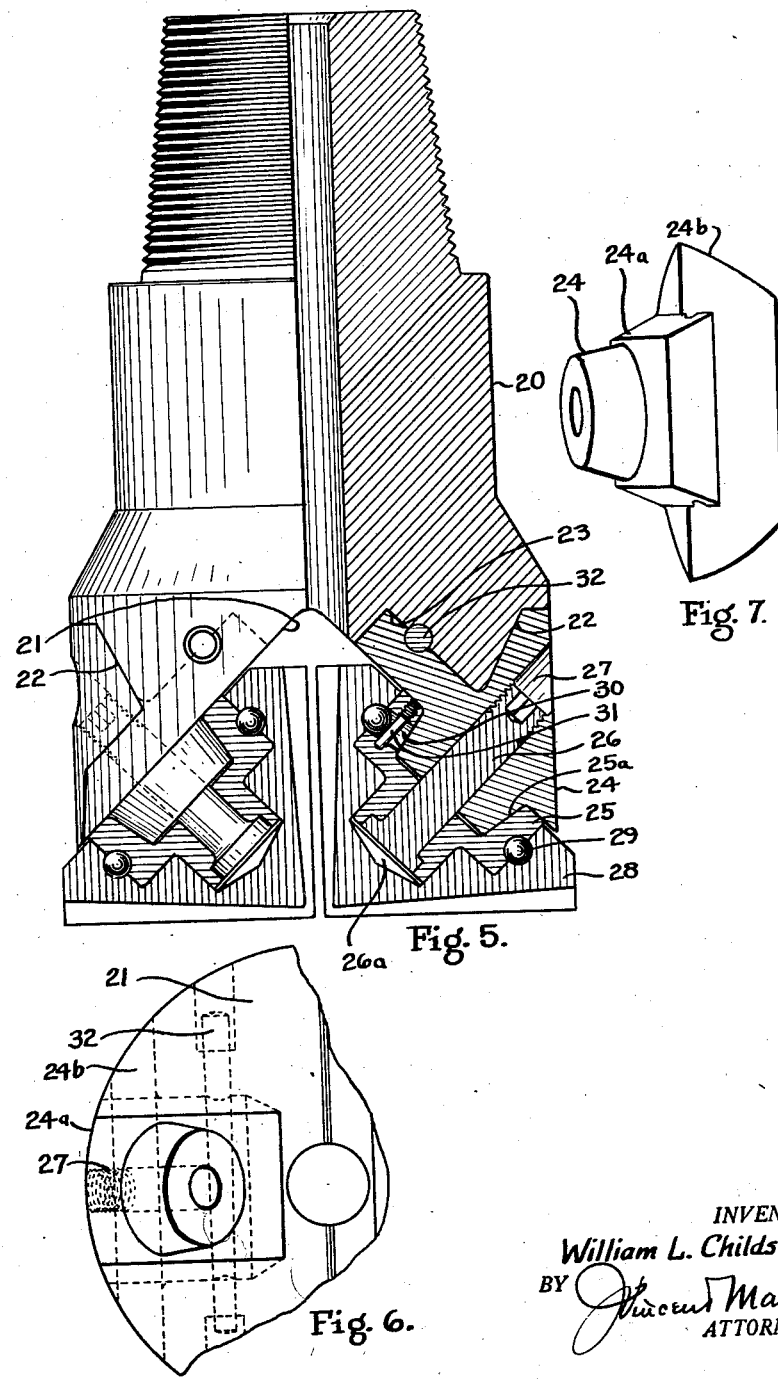

1,779,587

UNITED STATES PATENT OFFICE

WILLIAM L. CHILDS, OF HOUSTON, TEXAS, ASSIGNOR TO REED ROLLER BIT COMPANY, OF HOUSTON, TEXAS, A CORPORATION OF TEXAS

ROLLER-CUTTER MOUNTING

Application filed April 9, 1927. Serial No. 182,484.

This invention relates to rotary boring drills for use in deep well drilling operations, and more particularly to roller bits.

It is the object of the invention to provide new and improved means to mount roller cutters in bit heads.

In the accompanying drawing, illustrative of two preferred embodiments of the invention, Fig. 1 is an elevation, partly in section, of a bit head with roller cutters mounted therein. Fig. 2 is a section on the line 2—2 of Fig. 1. Fig. 3 is a fragmentary bottom plan view showing the cutter spindle in perspective mounted in the head. Fig. 4 is a detail bottom view in perspective of the cutter spindle. Figs. 5 and 6 are views similar to Figs. 1 and 3 respectively, illustrating a modification of the construction disclosed in the former. Fig. 7 is a detail bottom view in perspective showing the spindle support used in the modified form.

Conical cutters have heretofore been mounted in and removed from a head of the type shown, by constructing the head in two pieces in order that the cutters may be slipped off their respective spindles in a direction longitudinal thereof. This invention provides removable spindles, slidable laterally into and out of the head, whereby the cutters can be independently mounted in and removed from a one piece head of the type shown. Various other advantageous uses will appear hereinafter.

Referring to Figs. 1, 2, 3 and 4, the bit head is indicated at 1 and has a screw-threaded shank 2, whereby it may be attached to the usual pipe, not shown. A central water course is shown at 3, discharging into a substantially V-shaped recess 4 in the bottom of the head.

An angular recess 5 is cut in the outer face of the head, and a dovetail slot 6 between outer recess 5 and inner recess 4. The inner wall $5^a$ of the outer recess 5 and the outer wall $4^a$ of the inner recess 4 are parallel and inclined upwardly and inwardly, as shown.

Shaped to slide laterally into the inner recess 4, outer recess 5, and intermediate slot 6, the invention provides a spindle 7. The spindle 7 has a dovetail $7^a$ and an extension $7^b$, dovetail $7^a$ and extension $7^b$ being shaped to conform with the contours of dovetail slot 6 and recess 5, respectively, and being slidable therein. A bore is cut through the head to receive a pin 10, said pin intersecting dovetail slot 6 and resting partly in groove $7^c$ of dovetail $7^a$ to lock the spindle in the head.

A raceway in the periphery of spindle 7 and a raceway in the inner surface of cutter 11, receive balls 12, whereby the cutter is rotatably locked on spindle 7.

Spindle 7 has a longitudinal bore 13 and a transverse bore 14 leading therefrom to the raceways. Balls 12 are inserted in and removed from the raceways through these bores. A removable plug $13^a$ is screw-threaded in bore 13. A third bore intersects bore 14, to receive a removable retaining pin 15, which extends across bore 14 and prevents the passage of balls 12 therethrough. Bore 14, it will be observed, is positioned on the inner side of spindle 7 so that pin 15 will not be subjected to the great pressure it would be if bore 14 were placed on the outer side of the spindle. Another embodiment of this feature of the invention is shown in my application, Serial No. 180,579, filed April 2nd, 1927.

The parts are thus assembled:—Plug $13^a$ having been removed from bore 13 and retaining pin 15 from bore 14, spindle 7 is slipped in cutter 11, and balls 12 inserted through bore 13 and bore 14 into the raceways. Retaining pin 15 is then put in place. Bores 13 and 14 are then packed with grease and plug $13^a$ screwed in bore 13. It is to be noted here that the spindle and cutter are thus assembled before being put into the head. This assembly, if desired, may be made prior to the departure of the parts from the plant. The danger of foreign matter getting between the cutter and its spindle while the parts are being put together where they are to be used may thereby be eliminated. The plug $13^a$ seals the grease in bores 13 and 14, which form a grease chamber. When friction and the surrounding heat in the hole have effected a heating of the parts, the grease will tend to flow out of bores 13 and 14 and into the raceways, and the ball bearing will thereby be efficiently lubricated. Plug 13ª blocks the passage of foreign matter into the bearing.

When pin 10 is knocked out, the spindle with the cutter thereon may be slid laterally out of the head.

From the foregoing, it will be seen that the invention provides a construction embodying few elements, and makes the assembly and removal of the same an easy and quickly-performed undertaking. And the parts are so proportioned that the construction is exceedingly strong and durable.

In the modified form of the invention illustrated in Figs. 5, 6 and 7, the bit head 20 has a substantially V-shaped recess 21 in the bottom thereof, and angular recesses 22 in the sides thereof, with a dovetail slot 23 therebetween. The spindle 24 has mounted thereon a bushing 25, said bushing being secured to said spindle by a pin 26 screw-threaded into bore 27. Bushing 25 has a centrally disposed recess 25ª, to receive spindle 24. Pin 26 has a head 26ª fitting over the end of bushing 25, as shown.

Bushing 25 and cutter 28 have opposite raceways wherein balls 29 are inserted through bore 30 in bushing 25 to rotatably lock the cutter on the bushing. A removable retaining pin 31 extends across bore 30 to hold the balls in the raceways.

Spindle 24, of which Fig. 7 is a bottom perspective view, has a dovetail 24ª and an extension 24ᵇ to slide, respectively, in dovetail slot 23 and recess 22 of head 20, said spindle being locked in the head by a pin 32, in the manner similar to the locking of the spindle 7 illustrated in Figs. 1, 2, 3 and 4.

To assemble the modified parts, pin 26 is first passed through bushing 25 and then bushing 25, with the pin therein, is placed in cutter 28. Balls 29 are inserted into the raceways through bore 30 to rotatably lock the cutter on the bushing. Pin 31 is put in place to prevent escape of the balls from the raceways. Spindle 24 is then placed in recess 25ª of bushing 25, pin 26 passing through bore 27 of said spindle. A tool (not shown) is then inserted in the squared recess in the end of pin 31, and said pin thereby screwed tightly in bore 27 to lock the bushing on its spindle. Spindle 24, carrying the bushing and the cutter is then slid into the head, dovetail 24ª and extension 24ᵇ entering dovetail slot 23 and recess 22, respectively. Pin 32 is then driven in to lock the spindle in the head.

When pin 32 is knocked out, the spindle carrying the bushing and the cutter may be slipped out of the head.

When bushing 25 of the modified form becomes worn, it can be replaced and spindle 24 again used.

In both forms of the invention the dovetail connection and the engagement of the extensions in the angular recesses, will give such great strength to the device that it will be practically as strong as if the parts were made integral with each other.

The invention provides parts so constructed that the assembly and separation thereof are tasks which can quickly and easily be executed.

I claim:

1. In a drill, a head having a slot therein, a recess in the outer face of said head, a spindle having an extension, said spindle being slidable laterally in said slot and said extension being slidable laterally in said recess, and a cutter mounted on said spindle.

2. In a drill, a spindle having a raceway and a longitudinal bore and a transverse bore, a cutter mounted on said spindle and having a raceway, and balls in said raceways removable through said bores.

3. In a drill, a spindle having a raceway and a longitudinal bore and a transverse bore smaller than said longitudinal bore, a cutter mounted on said spindle and having a raceway, and balls in said raceways removable through said bores.

4. In a drill, a head having an inner recess and an outer recess, and a slot in the wall of said inner recess, a spindle laterally slidable in said slot and said outer recess, and a cutter on said spindle and laterally slidable in said inner recess.

5. In a drill, a head having an inner recess and an outer recess and a slot in the wall of said inner recess, a spindle having an extension laterally slidable in said outer recess and a lateral projection laterally slidable in said slot, and a cutter on said spindle and laterally slidable in said inner recess.

6. In a drill, a head having an inner and an outer recess, one wall of each of said recesses being inclined upwardly and inwardly, the said one wall of said inner recess having a slot therein, a spindle laterally slidable in said slot and shaped to engage said walls, and a cutter on said spindle.

7. In a drill, a head having an inner and an outer recess, the inner wall of said outer recess and the outer wall of said inner recess being substantially parallel to each other, the said outer wall of said inner recess having a slot therein, a spindle laterally slidable in said slot and shaped to engage said walls, and a cutter on said spindle.

WILLIAM L. CHILDS.